United States Patent
Bohaychuk

(10) Patent No.: US 7,699,075 B2
(45) Date of Patent: Apr. 20, 2010

(54) REVERSE FLOW FLOW TRIM FOR CHOKE VALVE

(75) Inventor: Larry J. Bohaychuk, Ardrossan (CA)

(73) Assignee: Master Flo Valve Inc., Edmonton (CA)

( * ) Notice: Subject to any disclaimer, the term of this patent is extended or adjusted under 35 U.S.C. 154(b) by 146 days.

(21) Appl. No.: 11/458,609

(22) Filed: Jul. 19, 2006

(65) Prior Publication Data
US 2007/0017586 A1    Jan. 25, 2007

Related U.S. Application Data

(60) Provisional application No. 60/700,618, filed on Jul. 19, 2005, provisional application No. 60/757,937, filed on Jan. 10, 2006.

(51) Int. Cl.
*F16K 3/24* (2006.01)
(52) U.S. Cl. .............................. 137/625.33; 137/625.37
(58) Field of Classification Search ............ 137/625.33, 137/625.37; 251/325
See application file for complete search history.

(56) References Cited

U.S. PATENT DOCUMENTS

| | | | | |
|---|---|---|---|---|
| 771,486 | A * | 10/1904 | McCarthy | 251/210 |
| 1,525,113 | A * | 2/1925 | Yarnall | 251/325 |
| 3,937,247 | A * | 2/1976 | Van der Wal | 137/375 |
| 4,471,810 | A * | 9/1984 | Muchow et al. | 137/625.37 |
| 4,540,022 | A | 9/1985 | Cove | |
| 4,735,229 | A * | 4/1988 | Lancaster | 137/375 |
| 6,536,473 | B2 * | 3/2003 | Bohaychuk | 137/625.37 |
| 6,648,070 | B2 | 11/2003 | Cove et al. | |
| 6,827,330 | B2 * | 12/2004 | Holst et al. | 251/121 |
| 6,892,818 | B2 * | 5/2005 | Mentesh et al. | 166/373 |
| 7,073,532 | B2 * | 7/2006 | Bowe | 137/625.33 |

FOREIGN PATENT DOCUMENTS

| | | |
|---|---|---|
| GB | 2 382 362 | 5/2003 |
| WO | WO 84/03922 | 10/1984 |
| WO | WO 2004/079158 | 9/2004 |

OTHER PUBLICATIONS

Cameron Willis, website (www.camerondiv.com), printed Nov. 2002.

* cited by examiner

*Primary Examiner*—John Fox
(74) *Attorney, Agent, or Firm*—Greenlee Winner and Sullivan PC

(57) ABSTRACT

A choke valve for use in reverse flow when mounted on a wellhead or manifold. The choke valve includes a valve body forming a T-shaped bore to provide a vertically extending bottom opening and a horizontally extending side opening. Flow trim is positioned in the T-shaped bore, optionally in a tubular sleeve or removable cartridge. The flow trim includes a tubular cage having a side wall forming an internal bore aligned with the body bottom opening, and a single flow port or a plurality of flow ports, each of the single flow port or plurality of flow ports being positioned for alignment with the body side opening. In reverse flow mode in the valve body, fluid from the bottom opening enters the cage and exits through the single flow port or plurality of flow ports directly into the body side opening.

13 Claims, 4 Drawing Sheets

REVERSE FLOW FLOW TRIM FOR CHOKE VALVE

CROSS REFERENCE TO RELATED APPLICATIONS

This application claims priority from U.S. Provisional Patent Application No. 60/700,618 filed Jul. 19, 2005 and U.S. Provisional Patent Application No. 60/757,937 filed Jan. 10, 2006. Each of these applications is incorporated herein in their entirety by reference.

BACKGROUND OF THE INVENTION

The present invention relates to a reverse flow choke valve used in connection with a wellhead, typically a choke valve having a removable insert assembly for an underwater wellhead. The invention also relates to the removable insert assembly component itself, including novel flow trim components.

Choke valves are flow throttling devices which control flow and reduce the pressure of the fluid moving through them. When the pressure is reduced, the velocity of the fluid increases.

The fluid moving through a choke valve can often be severely erosive. For example, a choke valve may be used to control a gas flow containing entrained sand and moving at high pressure and velocity. It follows that a choke valve is a critical piece of wellhead flow control equipment, which must be designed and constructed to cope with an erosive flow.

Choke valves which are used in underwater or sub sea service may be located at great depths, for instance 6000 feet. At such depths, wellhead servicing has to be carried out using an unmanned, remotely operated vehicle, referred to as an "ROV". Sub-sea choke valves typically are designed with the wear components in an insert assembly which can be removed by remote servicing.

FIG. 1 illustrates a prior art choke valve used in sub sea service. This choke valve is designed to be vertically oriented in use, so that its operating parts can be removed and replaced as a unit using a vertical cable extended from surface. The choke valve includes the following:

A body having a T-shaped arrangement (T on its side) of bores providing a horizontal side inlet, a vertical bottom outlet and a vertical chamber for containing operating components (the inlet and outlet bores have an inverted L shaped configuration);

A generally tubular cartridge vertically positioned in the chamber and extending across the side inlet, the side walls of the cartridge forming a side port connecting with the inlet, A "flow trim" positioned within the bore of the cartridge and including a stationary tubular cylinder referred to as a nozzle or "cage", and a vertically oriented, tubular, external sleeve (flow collar) having one closed end, the sleeve being positioned to slide along the cage side wall to throttle the ports. The cage is seated on an internal shoulder formed by the lower end of the cartridge. It extends across the inlet and its bore is vertical, being axially aligned with the outlet. The cage has a plurality of flow ports, spaced around its circumference, extending through its side wall. As shown in FIG. 1, there are generally at least two opposing main ports and at least two opposing smaller ports. The cage flow ports communicate through the cartridge port with the inlet. Fluid enters the cage bore from the horizontal inlet through the flow ports, changes direction within the cage and leaves through the vertical body outlet. In moving through the flow ports, the fluid pressure is reduced and its velocity is increased, thereby increasing the erosiveness of the stream;

A bonnet assembly secured to the cartridge and closing the upper end of the body chamber. The bonnet assembly is also secured to the body by clamp means which can be undone by the ROV, to release the bonnet assembly from the body; and A stem extending through an opening in the bonnet assembly and connecting with the flow trim sleeve. An actuator (not shown), powered by a hydraulic system operated from surface, can rotate the stern to advance and retract the sleeve, thereby adjusting the open area of the cage flow ports.

The cartridge and its contained components, as just described, can be referred to as a choke removable insert assembly.

The valve body is formed of softer material, typically steel, while the flow trim components are typically manufactured from a high wear material such as tungsten carbide. The steel body needs to be machined in the course of fabrication and it also has to be able to cope with stresses, and thus is manufactured from a relatively ductile steel. The flow trim however has harder surfaces. Typically the cage of the flow trim is formed of tungsten carbide and a tungsten carbide liner is shrink fitted to line the flow collar. This is important because the flow trim is positioned at the bend of the "L", where it is exposed to, and temporarily contains, the fluid flow when it is accelerated, is changing direction and is in a turbulent state.

When a sub sea well is first completed, the subterranean formation containing the oil or gas will typically be at sufficient pressure to drive the produced fluid to surface. The well is referred to as a "flowing" well. However, over time the formation pressure diminishes. Eventually it may be desirable to inject water or other fluid into the formation, through one or more wells, to increase its pressure and maintain the formation flowing capability. This requires fluid to be pumped under pressure or "injected" through the choke valve in the opposite or reverse direction. If this is done with the valve shown in FIG. 1, the fluid exits the partly closed ports of the flow trim as high velocity, angled jets that impinge against and erode the steel material of the choke body.

To try to reduce the erosion when a well is converted to reverse flow, well operators have resorted to operating the choke valve with a reduced pressure drop, which is an undesirable restriction. Another alternative is use a multiport cage, for example a 16 port cage, with the ports being arranged circumferentially around the cage, to distribute the wear to the body more uniformly around the cage. However, this is still undesirable since the body, which is retrievable only by retrieving the entire wellhead tree, is still directly exposed to wear.

U.S. Pat. No. 6,648,070 to Cove et al., and owned by the assignee of the present patent application, Master Flo Valve Inc., describes an insert assembly for a sub-sea choke designed for reverse flow with a horizontal cage and collar, but requiring complicated components to actuate these horizontal components.

The present invention is concerned with providing a reverse flow insert assembly which can replace the production insert assembly when the well is to be changed from production to injection, but which is simple in design,

SUMMARY OF THE INVENTION

In accordance with the invention, the flow trim components of the removable choke insert assembly are altered in order to accommodate reverse flow. When reverse flow injection mode is needed, the insert assembly of the choke valve is retrieved and the multi-port cage component of the prior art choke insert assembly (described above) is removed and replaced with a reverse flow cage according to the present invention is inserted. The cage of this invention has its one or plurality of ports (termed cage flow port(s)) aligned with the valve inlet for direct flow (in reverse mode) into the valve side opening. This minimizes the effect of fluid impingement onto the valve body by projecting the fluid directly into the valve inlet (now being used as the valve outlet). Fluid flow through the valve is controlled with the original flow trim components including the flow collar (either as an internal plug or an external sleeve), partially covering the cage flow port(s) to vary the area exposed to fluid flow.

As a result of this arrangement, fluid pumped in through the bottom opening (formerly the "outlet") of the choke body enters the cage bore or cavity. The flow then exits through the cage flow port(s) directly into the side opening (formerly the "inlet"). To accommodate the higher stress loads exhibited by the fluid pressure in these regions, the cage and the liner of the flow collar are preferably formed from ductile, wear resistant materials such as stainless steel or Stellite™, or are coated with wear resistant materials.

The cartridge, the reverse flow trim, the bonnet assembly and the stem assembly combine to form a reverse flow assembly in the body of a sub-sea choke valve. This assembly can be lowered as a unit by cable from surface, dropped into place in the choke body and be secured in place using the ROV. Thereafter fluid can be pumped in a "reverse" direction into the wells with reduced pressure drop restrictions and erosion effect.

In one broad aspect, the invention provides a choke valve for use in reverse flow when mounted on a wellhead or manifold, the choke valve comprising:

a valve body forming a T-shaped bore comprising a vertically extending bottom opening and a horizontally extending side opening;

a bonnet connected with and closing the upper ends of body, the bonnet being disengagably connected with the body;

a flow trim positioned in the T-shaped bore, the flow trim comprising a tubular cage having a side wall forming an internal bore aligned with the body bottom opening, and a single flow port or a plurality of flow ports, each of the single flow port or plurality of flow ports being positioned for alignment with the body side opening, whereby in reverse flow mode in the valve body, fluid from the bottom opening enters the cage and exits through the single flow port or plurality of flow ports directly into the body side opening, the flow trim further comprising an external flow collar or internal plug for sliding along the cage side wall to throttle the single flow port or plurality of flow ports; and a stem extending through the bonnet, for biasing the flow collar or plug.

In another broad aspect, the invention provides this choke valve with the components arranged as a removable insert assembly, wherein:

a) the valve body forms a vertical cartridge chamber at the intersection of the body side and bottom openings;

b) the flow trim, stem and bonnet form part of, and are housed within, a removable insert assembly to position flow trim in the cartridge chamber, the removable insert assembly comprising:

i. a tubular cartridge having a side wall forming an internal bore and a single side port communicating with the body side opening, whereby fluid may enter through the body bottom opening and exit through the cartridge side port to the body side opening, the cartridge having upper and lower ends, the lower end being seated and sealed In the valve body adjacent the bottom opening;

ii. the bonnet connected with and closing the upper ends of the cartridge and the body, the bonnet being disengagably connected with the body;

iii. the flow trim positioned in the cartridge internal bore, the flow trim comprising the tubular cage having the side wall forming the internal bore aligned with the body bottom opening, and each port of the single flow port or the plurality of flow ports being aligned with both the cartridge side port and the body side opening, whereby fluid from the bottom opening may enter the cage and pass out through the single flow port or plurality of flow ports directly into the body side opening, the flow trim further comprising the external flow collar or internal plug for sliding along the cage side wall to throttle the single flow port or plurality of flow ports; and iv. the stem extending through the bonnet, for biasing the flow collar or plug.

When the cage flow port takes the form of a plurality of flow ports, the flow trim preferably includes the external flow collar (rather than the internal plug) and the cage flow ports are arranged in a cluster, preferably a circular cluster, with each port being aligned with the cartridge side port and the body side opening, said plurality of flow ports being arranged in a pattern sized smaller to larger in the direction of opening so as to limit jetting through the ports as they are partially opened.

In a preferred embodiment, the choke valve further comprises alignment means, such as alignment pins, located between the cartridge and the cage for aligning the cartridge side port and either the single flow port or the plurality of flow ports with the body side opening. Most preferably, the alignment means takes the form of alignment pins located in a seat assembly formed across the annulus formed between the cartridge and the cage.

The present invention also broadly extends to a removable insert assembly as set forth above.

The terms and expressions in this specification are, unless otherwise specifically defined herein, used as terms of description and not of limitation. There is no intention, in using such terms and expressions, of excluding equivalents of the features illustrated and described, it being recognized that the scope of the invention is defined and limited only by the claims.

BRIEF DESCRIPTION OF THE DRAWINGS

The present invention will be further described by way of example and with reference to the following figures in which similar references are used in different figures to denote similar components.

DETAILED DESCRIPTION OF THE INVENTION

In order to illustrate the present invention, the flow trim component is shown in the figures to be of the internal cage, external flow collar design, similar to that described in U.S. Pat. No. 4,540,022, although the flow trim is shown as housed in an insert cartridge, as is often used in sub-sea applications. However, it should be understood that the flow trim component of this invention has application in choke valve assemblies more broadly, including for example flow trim wherein the external throttling sleeve (flow collar) is modified to be an internal plug (not shown). As well, the flow trim may have application in choke valves not equipped with removable choke insert assemblies, in which case the flow trim may optionally be located within a single ported tubular sleeve, the single port being aligned with the side opening of the choke valve.

Figure 1:
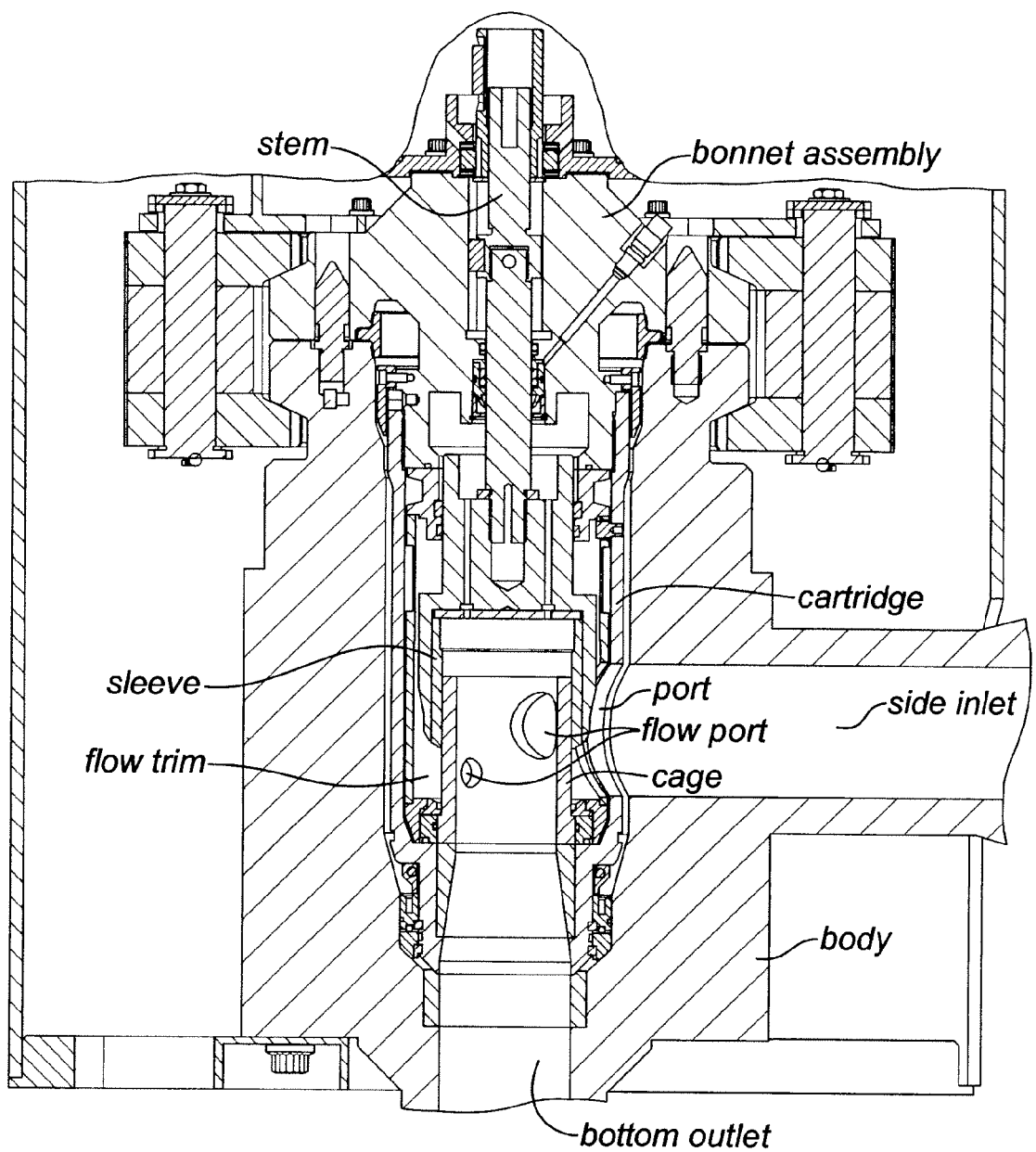
FIG. 1 is a sectional side view of a prior art production insert assembly positioned in the body of a choke valve, as it would be used to control flow through a wellhead (not shown) when it is in the production mode.
Figure 2:
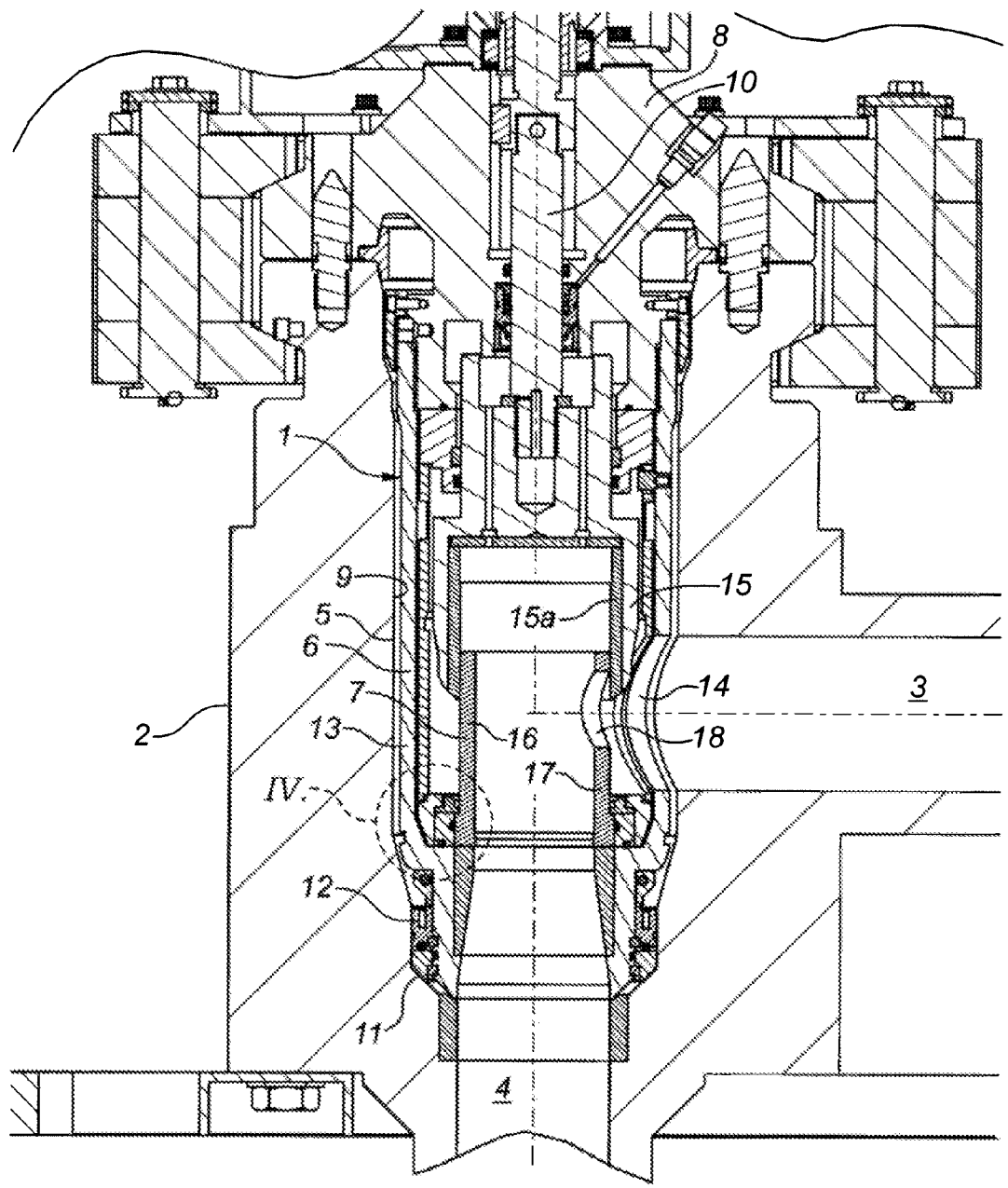
FIG. 2 is a sectional side view similar to FIG. 1 but showing a reverse flow insert assembly of the invention with flow trim including an external flow collar and cage, for use to control flow through a wellhead when it is in the injection mode (reverse flow).

The reverse flow insert assembly 1 of the present invention is shown positioned in a choke valve body 2 in reverse flow mode in FIG. 2, and can be readily contrasted with the prior art multi-port insert assembly shown in flow mode in FIG. 1. In FIG. 2, the valve body 2, when mounted vertically to a wellhead (not shown), forms a T-shaped arrangement of bores comprising a horizontal side opening 3, a bottom opening 4 and a cartridge chamber 5.

The insert assembly 1 comprises a tubular insert cartridge 6, a flow trim 7 positioned within the cartridge 6, a bonnet assembly 8 closing the upper end of the cartridge bore 9, and a stem assembly 10. With the exception of the novel reverse flow, flow trim 7 of this invention, these other elements are generally well known in the art, and will be only briefly described herein.

The insert cartridge 6 is shown to consist of a tubular structure used to house the valve internals and flow trim to facilitate separation and containment of the valve internals from the valve body during an insert retrieval. The insert cartridge 6 is typically vertically oriented and seats on an internal shoulder 11 of the body 2. The lower end of the cartridge 6 is sealed to the body 2 by a seal assembly 12. The insert cartridge 6 surrounds the flow trim 7. Typically this cartridge 6 is connected to the bonnet assembly 8 and fit into the valve body 2 at each end providing suitable support. The cartridge side wall 13 forms a single side port 14. The cartridge 6 is positioned so that the side port 14 communicates and registers directly with the body side opening 3.

The flow trim 7 includes a flow collar 15 and a cage 16. The cage 16 is tubular, having a side wall 17 forming a bore which communicates with the bottom opening 4. The cage 16 is oriented vertically within the cartridge 6. The side wall 17 further forms a single flow port 18 aligned to communicate directly through the cartridge side port 14 to the body side opening 3. Although not shown in FIG. 2, it should be understood that the single port 18 could have alternate shapes to limit jetting as the port 18 is initially opened, or may take the form of a plurality of smaller ports 18a in a cluster, for instance a plurality of circular ports arranged in a generally circular pattern, all aligned for direct communication through the cartridge side port 14 to the body side opening 3. The ports 18a have centers located along lines generally parallel to the axis of the body side opening 3.

Figure 3:
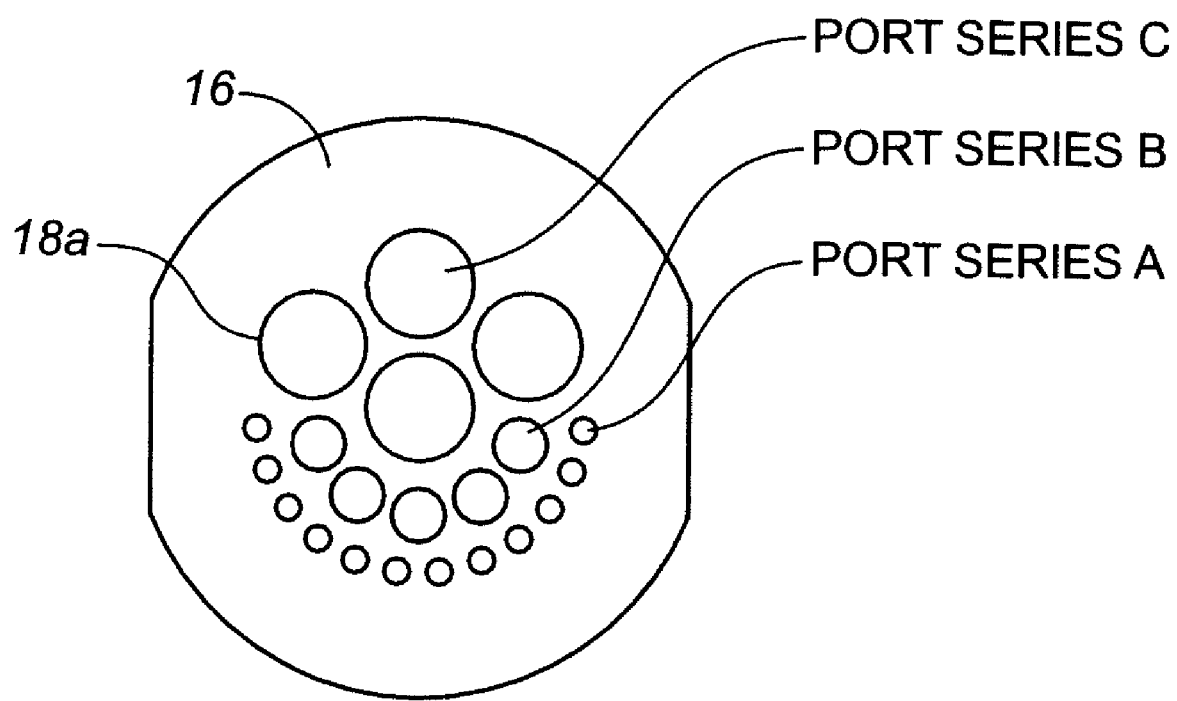
FIG. 3 is an end view, viewed through the side opening of the valve body, of a plurality of cage flow ports arranged in a cluster adapted to take the place of the single cage port of FIG. 2.

One embodiment of a flow trim cage 16 having a plurality of ports arranged in a cluster to replace single port 18 is shown in FIG. 3. This embodiment has utility with the external flow collar 15 shown in FIG. 2. In FIG. 3, the cluster of ports is shown generally at 18a to be arranged in a generally circular pattern (end on view looking at the port 18a through the port 14 of the cartridge side wall) in alignment for direct communication through the cartridge side port 14. The port pattern 18a is beneficial in controlling the angle of the fluid exiting the cage as the flow collar 15 is progressively opened. With a single port 18, as described above, the fluid exiting the cage as the port is initially opened has a tendency to jet at an angle toward the soft steel of the body side opening 3 (termed jetting). This can erode the valve body. The preferred port pattern 18a includes a series of ports, preferably arranged in a circular pattern and being progressively larger in the valve opening direction. By using this port pattern 18a, when the flow collar 15 is initially withdrawn to open the port 18a, a protective curtain of fluid is created through the smaller openings of the port, labeled "series A", and fluid is released directly into the body side opening 3, generally parallel to the axis of the body side opening (i.e., horizontally in FIG. 2). The fluid exiting through small ports A acts as a fluid curtain to form a protective barrier from fluid jets being directed into the body side opening 3 as the next larger of the ports of 18a are thereafter partially uncovered. In FIG. 3, the next larger of the ports are labeled as "series B". As the series B ports are partially uncovered by opening collar 15, fluid exiting those ports B at an angle encounter the horizontal fluid curtain from ports A, to prevent or limit erosion of the valve body in the side opening 3. As the series B ports are fully opened a second stronger horizontal fluid curtain is created to protect the valve body from the angled flow or jetting that occurs from partially opening the larger ports of 18a, labeled "series C". This progressive opening pattern eliminates the primary concern of damaging the valve body as high velocity fluid jets created from partially opened ports exit the cage 16. As shown in FIG. 3, the smaller series A ports are preferably arranged in a generally semi-circular pattern to be opened in advance of the series B ports, also arranged in a generally semi-circular pattern but spaced from the A ports in the opening direction.

Figure 4:
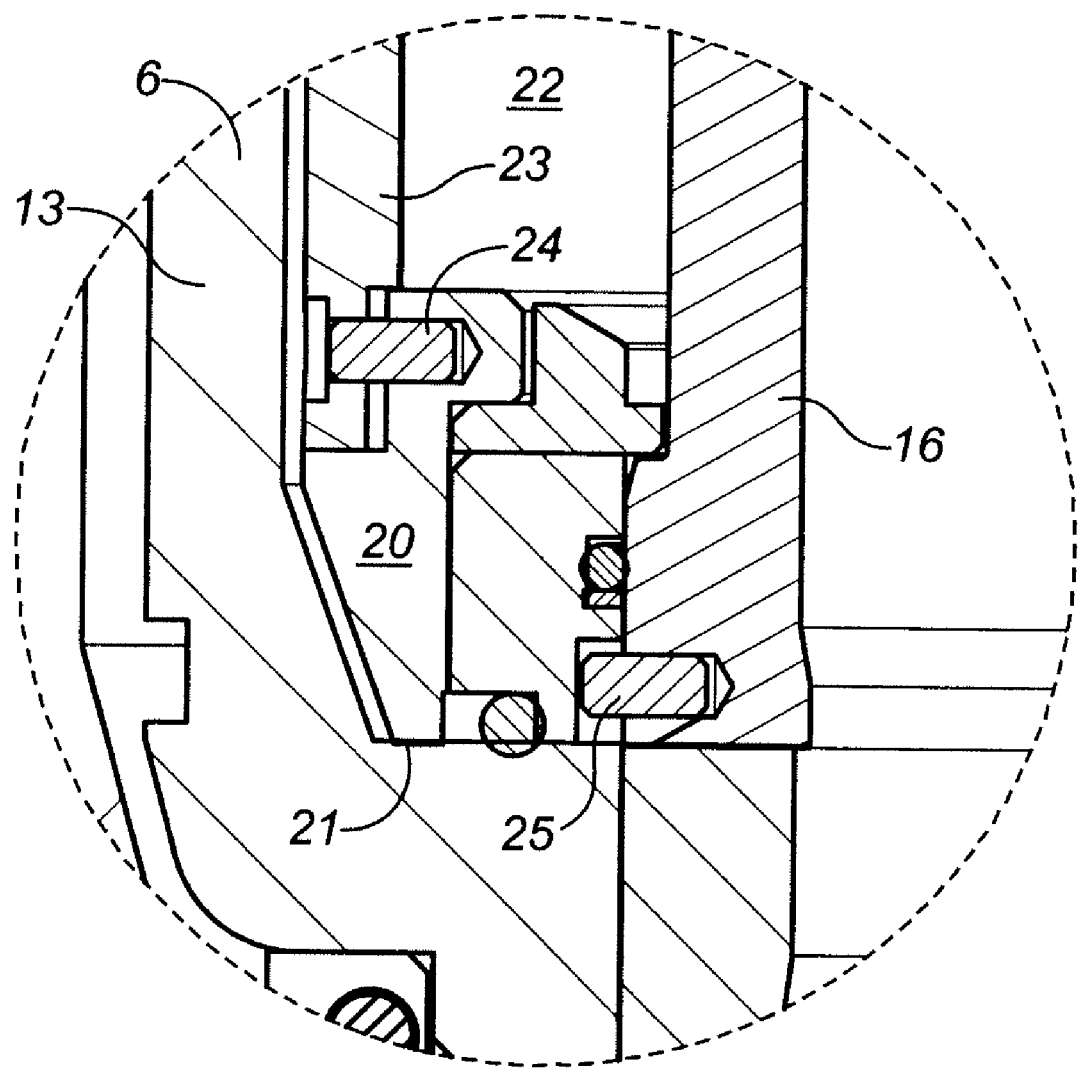
FIG. 4 is an enlarged sectional view of the area within circle IV in FIG. 2, showing one embodiment of alignment means to align the cartridge port and the cage flow port(s) with the side opening of the valve.

In a preferred embodiment, the invention further provides alignment means between the cartridge 6 and the cage 16 to maintain strict alignment of the cartridge side port 14 and the cage flow port(s) 18 or 18a such that these ports 14, 18 or 14, 18a remain commonly centered with the axis of the body side opening 3. In this way, flow exiting these ports flows directly in line with the body side opening 3. One embodiment of the alignment means is shown in FIG. 4, which is an enlarged section of the area within circle IV of FIG. 2. This enlarged view illustrates known components of this type of choke valve, together with the alignment means of this invention. A seat assembly 20 is seated and sealed on an inwardly extending seat shoulder 21 formed by the cartridge 6. This seat assembly 20 has multiple components, as shown, but extends between the cartridge 6 and the cage 16, closing the annulus 22 therebetween, and providing a stop for the flow collar 15 when the choke is closed. The cartridge 6 is lined with a cartridge sleeve 23. In order to align the cartridge 6 and cage 16 with the side opening 3, first and second alignment pins 24, 25 are shown, with the first alignment pin 24 locking the seat assembly 20 to the cartridge sleeve 23, and the second alignment pin locking the cage 16 to the seat assembly 20. In this manner, the cage 16 is located and retained in an aligned manner within the cartridge 6 such that the ports 14, 18 or 14, 18a are aligned with the axis of the side opening 3 of the valve body 2. Other alignment means may be used between the cage 16 and cartridge 6, such as are known to those skilled in art to align and lock together two tubular bodies.

When the present invention is operated in reverse flow, fluid enters from the bottom opening 4 directly into the cage 16, and exit via the single port 18 (or plurality of ports 18a) and cartridge port 14 into the body side opening 3. Because of the pressures contained within the cage 16 and the flow collar 15, these components are in tension. Thus, it is desirable to manufacture the cage 16, and preferably also a liner 15a within the flow collar 15, from ductile, wear resistant materials such as Stellite or stainless steel. Alternatively these components which are exposed to wear may be coated with wear resistant coatings.

As mentioned above, the flow trim 7 of FIG. 2 may be modified to include an internal throttling plug (not shown) in place of the external flow collar 15, as is known in the art. The embodiment of the cage 16 having the plurality of ports 18a shown in FIG. 3 is best used with the external flow collar 15 rather than an internal plug.

As used herein, "comprising" is synonymous with "including," "containing," or "characterized by," and is inclusive or open-ended and does not exclude additional, unrecited elements or method steps. The invention illustratively described herein suitably may be practiced in the absence of any element or elements, limitation or limitations which is not specifically disclosed herein. The use of the indefinite article "a" in the claims before an element means that one of the elements is specified, but does not specifically exclude others of the elements being present, unless the context clearly requires that there be one and only one of the elements.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by the preferred embodiments and optional features, modification and variation of the concepts herein disclosed may be resorted to by those skilled in the art, and that such modifications and variations are considered to be within the scope of this invention as defined by the claims.

All publications mentioned in this specification are indicative of the level of skill in the art of this invention. All publications are herein incorporated by reference to the same extent as if each publication was specifically and individually indicated to be incorporated by reference.

What is claimed is:

1. A choke valve for use in reverse flow when mounted on a wellhead or manifold, the choke valve comprising:
   a valve body forming a T-shaped bore comprising a vertically extending bottom opening and a horizontally extending side opening;
   a bonnet connected with and closing the upper ends the body, the bonnet being disengagably connected with the body;
   a flow trim positioned in the T-shaped bore, the flow trim comprising a tubular cage having a side wall forming an internal bore aligned with the body bottom opening, and a plurality of flow ports formed in the side wall at the body side opening, each of the plurality of flow ports being positioned only at the body side opening for alignment with the body side opening, whereby in reverse flow mode in the valve body, fluid from the bottom opening enters the cage and exits only through the plurality of flow ports directly into the body side opening, the flow trim further comprising an external flow collar or internal plug for sliding along the cage side wall to throttle the plurality of flow ports; and
   a stem extending through the bonnet, for biasing the flow collar or plug.

2. The choke valve of claim 1, wherein:
   a) the valve body forms a vertical cartridge chamber at the intersection of the body side and bottom openings;
   b) the flow trim, stem and bonnet form part of, and are housed within, a removable insert assembly to position flow trim in the cartridge chamber, the removable insert assembly comprising:
      i. a tubular cartridge having a side wall forming an internal bore and a single side port communicating with the body side opening, whereby fluid may enter through the body bottom opening and exit through the cartridge side port to the body side opening, the cartridge having upper and lower ends, the lower end being seated and sealed in the valve body adjacent the bottom opening;
      ii. the bonnet connected with and closing the upper ends of the cartridge and the body, the bonnet being disengagably connected with the body;
      iii. the flow trim positioned in the cartridge internal bore, the flow trim comprising the tubular cage having the side wall forming the internal bore aligned with the body bottom opening, and each port of the plurality of flow ports being positioned only at the cartridge side port and the body side opening for alignment with both the cartridge side port and the body side opening, whereby fluid from the bottom opening may enter the cage and pass out only through the plurality of flow ports directly into the body side opening, the flow trim further comprising the external flow collar or internal plug for sliding along the cage side wall to throttle the plurality of flow ports; and
      iv. the stem extending through the bonnet, for biasing the flow collar or plug.

3. The choke valve of claim 2, wherein the flow trim includes the external flow collar for sliding along the cage side wall, and wherein the cage is formed with the plurality of flow ports arranged in a cluster, each flow port being aligned with the body side opening, said plurality of flow ports being arranged in a pattern sized smaller to larger in a direction of opening so as to limit jetting through said ports as they are partially opened.

4. The choke valve of claim 2, further comprising alignment means located between the cartridge and the cage for aligning the cartridge side port and the plurality of flow ports with the body side opening.

5. The choke valve of claim 4, wherein the flow trim includes the external flow collar for sliding along the cage side wall, and wherein the cage is formed with the plurality of flow ports arranged in a generally circular cluster and sized smaller to larger in the direction of opening, each flow port being aligned with the body side opening.

6. The choke valve of claim 5, further comprising a seat assembly formed across an annulus existing between the cartridge and the cage, and wherein the alignment means comprises alignment pins between the seat assembly, the cartridge and the cage.

7. The choke valve of claim 1, wherein the flow trim includes the external flow collar for sliding along the cage side wall, and wherein the cage is formed with the plurality of flow ports arranged in a cluster, each flow port being aligned with the body side opening, said plurality of flow ports being arranged in a pattern sized smaller to larger in a direction of opening so as to limit jetting through said ports as they are partially opened.

8. The choke valve of claim 1, further comprising:
a tubular sleeve having a side wall positioned vertically in the T-shaped bore and having the single side port formed in the tubular sleeve side wall to communicate with the body side opening, whereby fluid may enter through the body bottom opening and exit through the tubular sleeve side port to the body side opening;
the flow trim being positioned in the tubular sleeve, with each of the plurality of flow ports of the cage being positioned only at the tubular sleeve side port and the body side opening for alignment with both the tubular sleeve side port and the body side opening; and
alignment means located between the tubular sleeve and the cage for aligning the tubular sleeve side port and the plurality of flow ports with the body side opening.

9. A removable insert assembly suitable for use within a choke valve having a valve body forming a T-shaped bore comprising a vertically extending body bottom opening and a horizontally extending body side opening, and forming a vertical cartridge chamber at the intersection of the body and side openings, wherein the removable insert assembly comprises:
  i. a tubular cartridge having a side wall forming an internal bore and a single side port communicating with the body side opening, whereby fluid may enter through the body bottom opening and exit through the cartridge side port to the body side opening, the cartridge having upper and lower ends, the lower end being seated and sealed in the valve body adjacent the bottom opening;
  ii. a bonnet connected with and closing the upper ends of the cartridge and the body, the bonnet being disengagably connected with the body;
  iii. a flow trim positioned in the cartridge internal bore, the flow trim comprising a tubular cage having a side wall forming a cage internal bore aligned with the body bottom opening, and a plurality of flow ports formed in the side wall, wherein each port of the plurality of flow ports is positioned only at the cartridge side port and the body side opening for alignment with both the cartridge side port and the body side opening, whereby in reverse flow mode in the valve body, fluid from the bottom opening may enter the cage and pass out only through the plurality of flow ports directly into the body side opening, the flow trim further comprising an external flow collar or internal plug for sliding along the cage side wall to throttle the plurality of flow ports; and
  iv. a stem extending through the bonnet, for biasing the flow collar or plug.

10. The removable insert assembly of claim 9, wherein the flow trim includes the external flow collar for sliding along the cage side wall, and wherein the cage is formed with the plurality of flow ports arranged in a cluster, each flow port being aligned with the body side opening, said plurality of flow ports being arranged in a pattern sized smaller to larger in a direction of opening so as to limit jetting through said ports as they are partially opened.

11. The removable insert assembly of claim 9, further comprising alignment means located between the cartridge and the cage for aligning the cartridge side port and the plurality of flow ports with the body side opening.

12. The removable insert assembly of claim 11, wherein the flow trim includes the external flow collar for sliding along the cage side wall, and wherein the cage is formed with the plurality of flow ports arranged in a generally circular cluster and sized smaller to larger in the direction of opening, each flow port being aligned with the body side opening.

13. The removable insert assembly of claim 12, further comprising a seat assembly formed across an annulus existing between the cartridge and the cage, and wherein the alignment means comprises alignment pins between the seat assembly, the cartridge and the cage.

* * * * *